A. TRIPLAT.
POTATO PLANTER.
APPLICATION FILED JUNE 15, 1916.
1,262,142.
Patented Apr. 9, 1918.
2 SHEETS—SHEET 1.
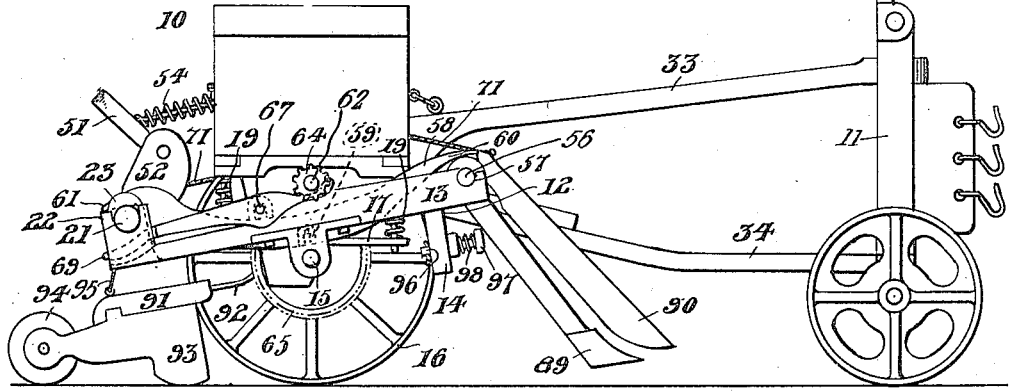
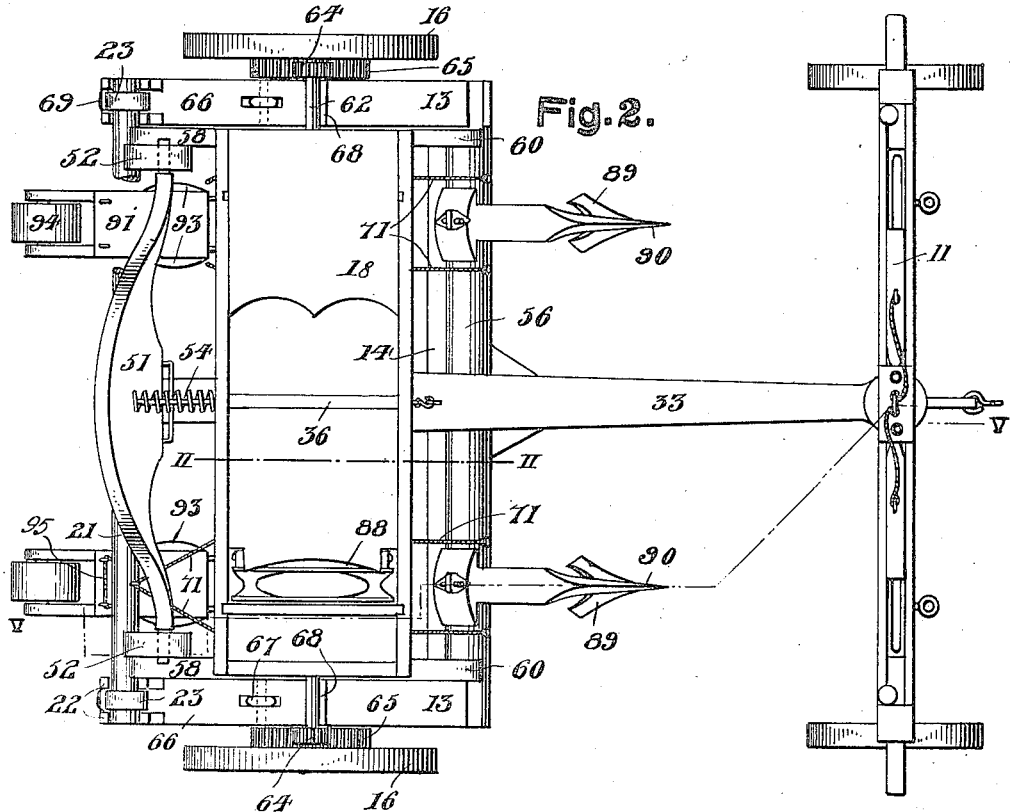
Inventor
A. Triplat
By A. M. Wilson
Attorney

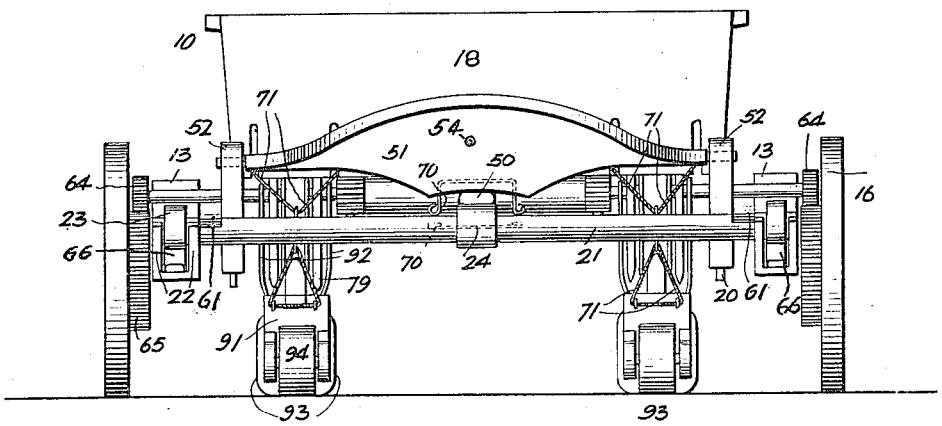
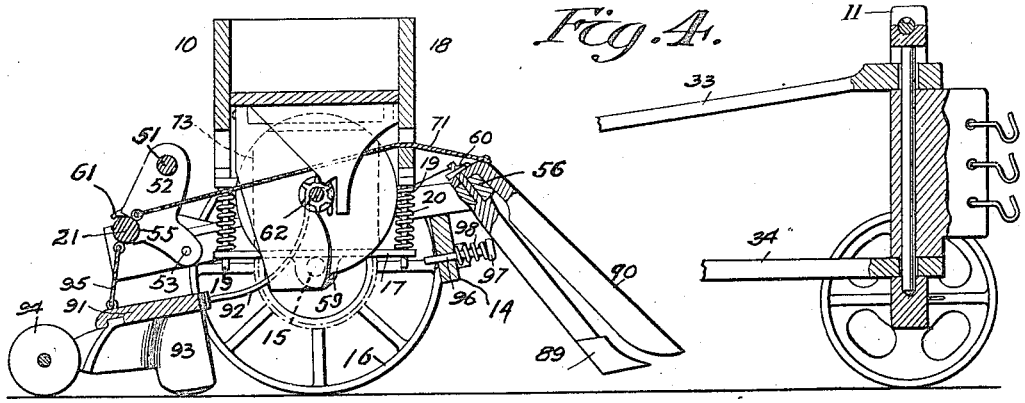
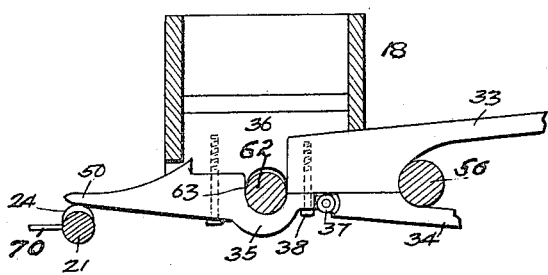

UNITED STATES PATENT OFFICE.

ANDRO TRIPLAT, OF CLEVELAND, OHIO.

POTATO-PLANTER.

1,262,142.  Specification of Letters Patent.  Patented Apr. 9, 1918.

Application filed June 15, 1916. Serial No. 103,776.

*To all whom it may concern:*

Be it known that I, ANDRO TRIPLAT, a subject of the King of Hungary, residing at Cleveland, in the county of Cuyahoga and State of Ohio, have invented certain new and useful Improvements in Potato-Planters, of which the following is a specification.

This invention relates to new and useful improvements in potato planters.

The primary object of the invention is the provision of an agricultural implement adapted for readily planting large quantities of potatoes during the travel of the implement across the field.

A further object of the device is the provision of an implement adapted to be forwardly propelled and arranged with a potato carrying hopper having an agitator and dropping device whereby the potatoes may be planted in furrows made by the implement and thereafter covered and rolled during the continuous travel of the device.

A still further object of the invention is the provision of a potato planter having a furrowing and covering attachment and further provided with a ground wheel operated agitator for the potato feeding hopper, provision being made for disconnecting the agitator from its operative connections simultaneously with the elevating of the furrowing and covering attachments to their inoperative positions when not desired for use.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—

Figure 1 is a side elevation of the device with one of the ground wheels removed.

Fig. 2 is a top plan view of the device.

Fig. 3 is a rear elevation of the same.

Fig. 4 is a vertical longitudinal sectional view taken upon line V—V of Fig. 2 partially broken away.

Fig. 5 is a transverse vertical view taken upon line II—II of Fig 2.

Referring more in detail to the drawings, the present implement designed for planting potatoes broadly consists of a two-wheeled planter carriage 10 rearwardly attached to a two-wheeled draft carriage 11 thereby forming a four-wheeled vehicle adapted to be forwardly propelled by any desirable traction means such as draft animals.

The planter carriage 10 consists of a U-shaped frame 12 having end beams 13 and a forward depending cross plate 14, the said beams being supported on stub axles 15 having ground wheels 16 upon their outer ends, while brackets 17 are carried by the inner ends of the said axles for resiliently mounting the potato receiving hopper 18 thereon. The hopper 18 is provided with depending rods 19 extending through perforations in the said brackets 17, mounting springs 20 being positioned on said rods between the hopper 18 and bracket 17.

A cam shaft 21 is journaled within U-shaped lugs 22 upon the rear ends of the beams 13 and is provided with cams 23 between the pairs of lugs 22 and with a relatively larger oppositely projecting central cam 24.

A suitable draft carriage 11 is provided to which the planter carriage is suitably attached as by connecting bars 33, 34.

The head 40 has a central perforation through which a pin 44 is vertically extended which passes through the locking rod 42, locking wedges 45 being also provided attached to the pin 44 by means of cords 46 and having curved ends 47 adapted for reception within perforations 48 of the head 40 when the wedges are arranged in their locking positions within longitudinal top grooves 49 in the rod 42.

The bearing block 35 has a reduced flattened rear end 50 engaged by the cam 24 for frictionally maintaining the shaft 21 in its adjusted positions. A rock bar 51 is journaled at its ends in lugs 52 which are pivotally secured to the beams 13 by means of pins 53, a centrally arranged spring 54 positioned between the hopper 18 and bar 51 tending to maintain the bar 51 in contact with the upper side of the bearing block end 50. The lugs 52 are provided with seats 55 for the reception of the adjacent side of the shaft 21.

A rock shaft 56 is arranged transversely forwardly of the hopper 18, journaled in sockets 57 in the forward ends of the beams 13. Retaining strips 58 are secured as at 59 Fig. 1 to the stub axles 15 and by means of the aforementioned pins 53 to the beams 13, the forward curved ends 60 of the strips 58 being slightly resilient and overlying the rock shaft 56 while the rear ends 61 of the strips 58 overlie the cam shaft 21. By this arrangement it will be understood that the strips 58 normally maintain the shafts 21 and 56 in their operative positions.

A feeding shaft 62 is journaled longitudinally beneath the hopper 18 extending through a journal bearing 63 arranged in the bearing block 35 and partition 36, the ends of the said feeding shaft having pinions 64 mounted thereon adapted to mesh with gears 65 attached to the inner sides of the rear wheels 16. Flat levers 66 are pivoted as at 67 upon the upper faces of the beams 13 and have curved inner ends 68 arranged beneath the feeding shaft 62 while the rear ends 69 of the said levers 66 extend between the pairs of beam carried lugs 22 being beneath the cams 23 of the shaft 21, the said ends 69 being normally elevated above the adjacent faces of the beams 13 with the pinions 64 in mesh with the said gears 65.

An operating yoke or bail 70 is rigidly secured to the cam shaft 21 centrally thereof and extends inwardly of the rock bar 51 and is held thereby as illustrated in Fig. 3 of the drawings when the cam shaft 21 is normally arranged with the cams 23 separated from the levers 66 and with the pinions 64 and gears 65 in meshing relations. Flexible connections such as cords 71 are secured between the shafts 56 and 21 whereby the shaft 56 is revolved in a corresponding direction upon the turning of the shaft 21 by means of its bail 70 as herein set forth. Suitable feeding means is operated by the feeding shaft 62, and a suitable agitator is arranged in each compartment of the hopper.

Furrow forming members or plows are secured to the forward rock shaft 56 and consist of plows 89 attached thereto and blades 90 secured to the said plows and shaft 56, the blades and plows being adapted for forming potato receiving furrows during the forward movement of the implement when the plows and blades are in their operative lowered positions as shown in Fig. 1 and 2 of the drawings.

A potato covering attachment is carried rearwardly of each of the furrow forming devices and consists of a support 91 having rods 92 pivotally hooked over the shaft 62 whereby the support 91 has free vertical movement during the operation of the device. Inwardly curved cover arms 93 are carried by the support 91 and adapted for holding the soil over the furrow formed by the aforementioned blades and plows, thus covering the furrow with the potatoes positioned therein. Rollers 94 are journaled between the rear ends of the arms 93 for following over the closed furrow and packing the soil upon the planted potatoes.

The complete operation of the device will be apparent from the present detailed description thereof, it being understood that the furrowing plows and blades 89, 90 form the furrow for receiving the potatoes from the feeding disks 72 while the covering devices follow thereafter for closing the furrows by means of the arms 93 and completing the planting operation by the packing rollers 94. The hopper 18 is arranged for dropping potatoes for two rows or furrows, it being understood that the invention contemplates a planter arranged for planting a single row as well as a greater number than two rows of potatoes, which modifications will fall within the spirit and scope of the present invention. The planting mechanism is rendered inoperative when desired to freely move the vehicle from one place to another. The rock plate 51 is slightly moved toward the hopper 18 for releasing the bail 70, the said bail being employed for revolving the cam shaft 21 for moving the cams 23 rotarily in contact with the ends 69 of the levers 66, which movements of the said levers elevates the forward end 68 thereof carrying the feed shaft 62 therewith and separating the pinions 64 from the wheel gears 65. Such movement of the cam shaft 21 also winds up thereon, the connecting cords 95 attached between the said shaft 21 and the supports 91 which thereby elevates the furrow covering attachments by moving the supports 91 and the rods 92 pivotally upon the shaft 62. The cords 71 which connect the shafts 21 and 56 together are also wound upon the cam shaft 21 during its rotation which turns the rock shaft 56 elevating the operative free ends of the plows 89 and blades 90, thus positioning the furrow forming members in their elevated inoperative positions. The frictional engagement of the block end 50 with the cam 24 maintains the shaft 21 with the elements in their inoperative arrangement until the shaft 21 is turned by means of its bail 70 for lowering the soil engaging members as well as the feeding shaft 62 and its pinions 64. The cam 24 engaging underneath the block end 50 raises same into frictional engagement with the rock bar 51, and the mechanism is thus held in the raised inoperative position until such time as it is lowered by grasping the bail 70 and turning the shaft 21 backward to lower the mechanism to planting position. Stop rods 96 are slidably arranged through the forward cross plate 14 having heads 97 positioned in the swinging paths of movement of the plows 89 and adapted to be contacted thereby during the furrow making operation, it being understood that buffer springs 98 are arranged between the heads 97 and the plate 14.

What I claim as new is:—

1. In a potato planter, the combination of a hopper or container, carrying means therefor including a frame, a rock-plate or member mounted upon pivotally positioned lugs, a bearing block arranged under said container and secured to a fixed member thereof, members of said carrying means having connection with said bearing block, levers pivoted upon the frame of said carrying means, a feeding shaft carrying the potato dropping members and geared to wheels of said carrying means, said levers having their inner ends arranged under the feeding shaft, a cam shaft having a central cam arranged under one end of said bearing block, and end cams having the opposite ends of said levers arranged thereunder, said cam shaft also having fixed thereto a yoke, said yoke being arranged to be engaged by said rock-plate, furrow forming means, a rock shaft arranged upon said carrying means or frame for lifting said furrow forming means, row or furrow covering means, flexible connections between said rock shaft and said cam shaft, for the turning of said rock shaft in a corresponding direction with said cam shaft upon the turning of the latter shaft, and flexible connections between said row covering means and said cam shaft.

2. In a potato planter, the combination of a hopper or container, carrying means therefor including a frame, a rock plate or member mounted upon pivotally positioned lugs, a bearing block arranged under said container and secured to a fixed member thereof, members of said carrying means having connection with said bearing block, flat levers pivoted upon said carrying means frame, a feeding shaft carrying the potato dropping members, and geared to wheels of said carrying means, said flat levers having their rear ends arranged under the feeding shaft, a cam shaft having a central cam arranged to engage one end of said bearing block, and end cams having the opposite ends of said flat levers arranged thereunder, said cam shaft also having fitted thereto a yoke, said yoke being arranged to be engaged by said rock plate, the stub-axles of the wheels of said carrying means, carrying at their inner ends brackets upon which is resiliently mounted said hopper, retaining strips secured to said stub-axles, the forward ends of said retaining strips being slightly resilient and overlying said rock shaft, the opposite ends of said retaining strips overlying said cam shaft for maintaining said rock shaft and said cam shaft in their operative positions, furrow-forming means, furrow or row covering means, flexible connections between said rock shaft and said cam shaft for the turning of said rock shaft in a corresponding direction with said cam shaft upon the turning of the latter shaft, and flexible connections between said cam shaft and said row or furrow covering means.

In testimony whereof I affix my signature.

ANDRO TRIPLAT.

Copies of this patent may be obtained for five cents each, by addressing the "Commissioner of Patents, Washington, D. C."